(12) United States Patent
Picron et al.

(10) Patent No.: US 8,234,052 B2
(45) Date of Patent: Jul. 31, 2012

(54) METHOD FOR MANAGING A TORQUE APPLIED TO AN OUTPUT SHAFT OF A COMBUSTION ENGINE WHEN ONE COMBUSTION CHAMBER IS DEACTIVATED, AND CORRESPONDING MANAGEMENT SYSTEM

(75) Inventors: Vanessa Picron, Pontoise (FR);
Claudine Rochette, Pontoise (FR);
Claudiu Vasilescu, Paris (FR); Anthony Girardin, Meudon (FR); Benoit Bizet, Pontoise (FR)

(73) Assignee: Valeo Systemes de Controle Moteur, Cergy Pontoise Cedex (FR)

( * ) Notice: Subject to any disclaimer, the term of this patent is extended or adjusted under 35 U.S.C. 154(b) by 741 days.

(21) Appl. No.: 12/374,500

(22) PCT Filed: Jul. 25, 2007

(86) PCT No.: PCT/FR2007/001275
§ 371 (c)(1),
(2), (4) Date: May 21, 2009

(87) PCT Pub. No.: WO2008/012432
PCT Pub. Date: Jan. 31, 2008

(65) Prior Publication Data
US 2009/0259380 A1   Oct. 15, 2009

(30) Foreign Application Priority Data

Jul. 25, 2006   (FR) ...................................... 06 06799

(51) Int. Cl.
*F02D 45/00* (2006.01)
*F02D 17/02* (2006.01)
(52) U.S. Cl. ..................................... 701/101; 123/198 F

(58) Field of Classification Search .................. 701/101, 701/102, 115; 123/198 F; 180/65.21, 65.28, 180/65.275
See application file for complete search history.

(56) References Cited

U.S. PATENT DOCUMENTS

| | | | |
|---|---|---|---|
| 4,706,522 A * | 11/1987 | Nitz ............................... | 477/154 |
| 6,382,163 B1 | 5/2002 | Murray et al. | |
| 7,534,194 B2 * | 5/2009 | Eguchi et al. ................... | 477/77 |
| 2005/0164826 A1 | 7/2005 | Albertson | |
| 2006/0032684 A1 | 2/2006 | Rayl | |
| 2006/0196463 A1 | 9/2006 | Pallett et al. | |
| 2011/0060489 A1 * | 3/2011 | Ketfi-Cherif et al. ........... | 701/22 |

FOREIGN PATENT DOCUMENTS

DE   195 32 164 A1   3/1997

OTHER PUBLICATIONS

International Search Report w/translation from PCT/FR2007/001275 dated Nov. 23, 2007 (6 pages).

* cited by examiner

*Primary Examiner* — Hieu T Vo
(74) *Attorney, Agent, or Firm* — Osha Liang LLP

(57) ABSTRACT

A method for managing a torque applied to an output shaft of a combustion engine, the combustion engine including combustion chambers, in each of which there is mounted a piston connected to the output shaft in order to apply a torque to it, the output shaft being connected to a rotary machine associated with a management member. The method involves detecting conditions of deactivation of one combustion chamber and controlling the rotary machine so as to apply to the output shaft, prior to the deactivation of one combustion chamber, a compensating torque which tends to cause a resultant torque applied to the output shaft to tend towards a deactivation torque applied by the combustion engine to the output shaft after deactivation of the combustion chamber.

17 Claims, 2 Drawing Sheets

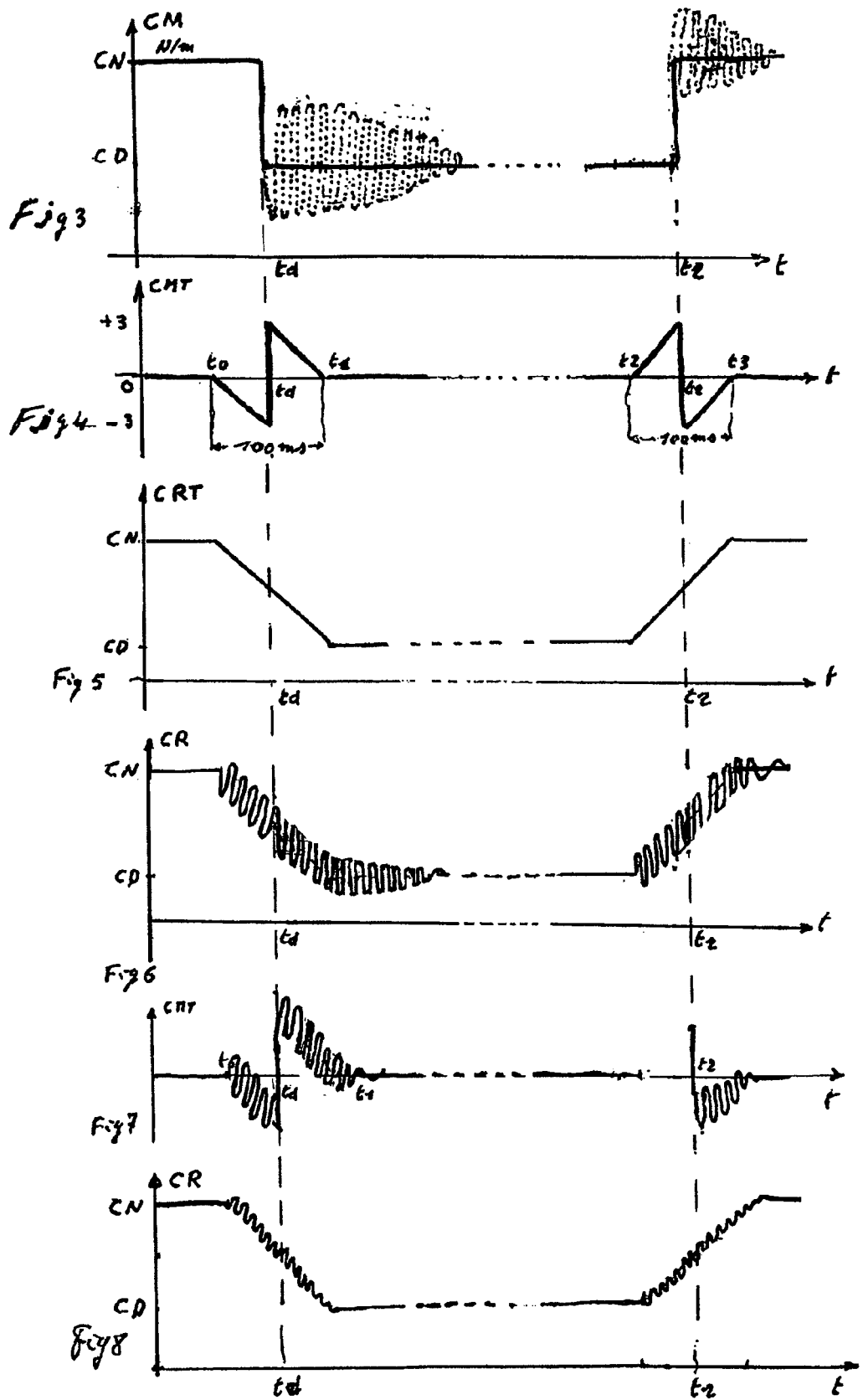

METHOD FOR MANAGING A TORQUE APPLIED TO AN OUTPUT SHAFT OF A COMBUSTION ENGINE WHEN ONE COMBUSTION CHAMBER IS DEACTIVATED, AND CORRESPONDING MANAGEMENT SYSTEM

The present invention relates to a method for managing a torque applied to an output shaft of a heat engine when a combustion chamber is deactivated, and a corresponding management system.

BACKGROUND OF THE INVENTION

A heat engine of a motor vehicle usually comprises cylinders delimiting combustion chambers in each of which is mounted a piston connected to an output shaft (or crankshaft) in order to apply a torque thereto. The output shaft is itself connected, via the gearbox, to wheels of the vehicle in order to rotate the latter. The output shaft is also connected to one or more auxiliary rotating machines such as the alternator in order to produce the electricity consumed onboard the vehicle.

There exist engines also comprising a member for managing a deactivation of one or more of the combustion chambers. Such engines with combustion chambers that can be deactivated usually comprise at least 8 combustion chambers. The deactivation of one or more combustion chambers makes it possible to limit fuel consumption when the engine load is constant. The deactivation of one or more combustion chambers however has the disadvantage of creating an imbalance of the output shaft that is likely to produce vibrations and relatively considerable operating noises. This imbalance is however less sensitive if the combustion chambers are numerous, so that the deactivation of the combustion chambers is used only in engines with large cubic capacity.

It is also a practice known from document U.S. Pat. No. 6,382,163 to reduce the imbalance during the deactivation phase itself, that is to say between the moments of deactivation and reactivation, by controlling a rotating machine such as an alternator starter coupled to the output shaft. However, the results obtained are not very satisfactory.

SUBJECT OF THE INVENTION

It would therefore be of value to have a method and a system making it possible to attenuate the consequences of an imbalance of the output shaft of a heat engine on the occasion of the deactivation and/or reactivation of one or more combustion chambers.

SUMMARY OF THE INVENTION

The invention proposes a method for managing a torque applied to an output shaft of a heat engine comprising combustion chambers in each of which is mounted a piston connected to the output shaft in order to apply a torque thereto, the output shaft also being connected to a rotating machine associated with a management member, the method comprising the steps of detecting conditions of deactivation of a combustion chamber and of controlling the rotating machine in order to apply to the output shaft, prior to the deactivation of a combustion chamber, a compensating torque tending to cause a resultant torque applied to the output shaft to change toward a deactivation torque applied by the heat engine to the output shaft after deactivation of the combustion chamber.

It has been found that the management of the transitional phases by the anticipation of a change in the resultant torque applied to the output shaft prior to the deactivation reduces the jump in torque at the moment of deactivation and of reactivation, which minimizes the imbalance to which the output shaft is subjected according to a first-order compensation.

According to an advantageous version of the invention, the compensating torque is also applied after the deactivation of the combustion chamber. This prevents any sudden variation in the torque applied to the output shaft at the moment of deactivation, which again minimizes the imbalance during the deactivation of the combustion chamber.

According to another advantageous aspect of the invention, the method also comprises the step of applying to the output shaft a correction torque compensating for an imbalance of the output shaft. This therefore manages to dampen the imbalance according to a correction of second order so that the resultant torque becomes stable virtually throughout the combustion chamber deactivation phase.

According to yet another aspect of the invention, provision is made for a system for managing a deactivation of at least one combustion chamber of a heat engine comprising several combustion chambers in each of which is mounted a piston connected to an output shaft in order to apply a torque thereto, the management system comprising a rotating machine connected to the output shaft and associated with a management member, the management member being configured so as to detect conditions of deactivation of a combustion chamber and to control the rotating machine in order to apply to the output shaft, prior to the deactivation of a combustion chamber, a compensating torque tending to cause a resultant torque applied to the output shaft to change toward a deactivation torque normally applied by the heat engine to the output shaft after deactivation of the combustion chamber.

The rotating machine will then exert on the output shaft a force for compensation for the imbalance by accelerating or slowing the output shaft.

According to one feature, the rotating machine is connected to the output shaft to draw off a share of the torque and is controlled by the management member in order to adapt the share of torque drawn off to the compensation of the imbalance.

The share of torque drawn off by the rotating machine is then determined in order to compensate for the imbalance for example by drawing off a relatively greater torque when it is necessary to slow down the output shaft and a relatively lesser torque when it is necessary to accelerate the output shaft.

According to another feature, the rotating machine is arranged to supply an additional torque to the output shaft and the management member is arranged to control the rotating machine so as to supply the additional torque as compensation for the imbalance.

The rotating machine may then supply torque to the output shaft in order to accelerate the latter so as to compensate for the decelerations of the output shaft that are associated with the imbalance.

According to an advantageous embodiment, the rotating machine is an alternator starter controlled by the management member in order to supply an additional torque to the output shaft or to draw off from the latter a share of torque in order to compensate for the imbalance.

The alternator starter is then operated to draw off torque from the output shaft or to supply an additional torque to the output shaft making it possible to compensate for the imbalance. The alternator starter allows a particularly fast and effective compensation of the imbalances.

Preferably, a detector is associated with the output shaft in order to measure the instantaneous speed of rotation of the output shaft, the management member being connected to the detector to control the rotating machine according to the instantaneous speed detected, and/or the management member comprises a memory containing laws for controlling the rotating machine according to the deactivated combustion chamber(s).

The control of the rotating machine is then relatively simple.

Other features and advantages of the invention will emerge on reading the following description of a particular, nonlimiting embodiment of the invention.

BRIEF DESCRIPTION OF THE DRAWINGS

Reference will be made to the appended drawings, amongst which:

FIG. 3 is a schematic representation illustrating the resultant torque applied to the output shaft on a heat engine during a deactivation of a combustion chamber without application of a compensating torque, FIG. 4 is a schematic representation of the compensating torque applied according to a first aspect of the invention, FIG. 5 is a representation similar to that of FIG. 1 of the theoretical resultant torque obtained during the application of a compensating torque according to FIG. 4, FIG. 6 is a representation similar to that of FIG. 5 of the real resultant torque obtained, FIG. 7 is a schematic representation of a compensating torque according to the invention to which is added a correction torque compensating for an imbalance of the output shaft, FIG. 8 is a schematic representation of the resultant torque obtained by application of the torque represented in FIG. 7.

DETAILED DESCRIPTION OF THE INVENTION

Figure 1:
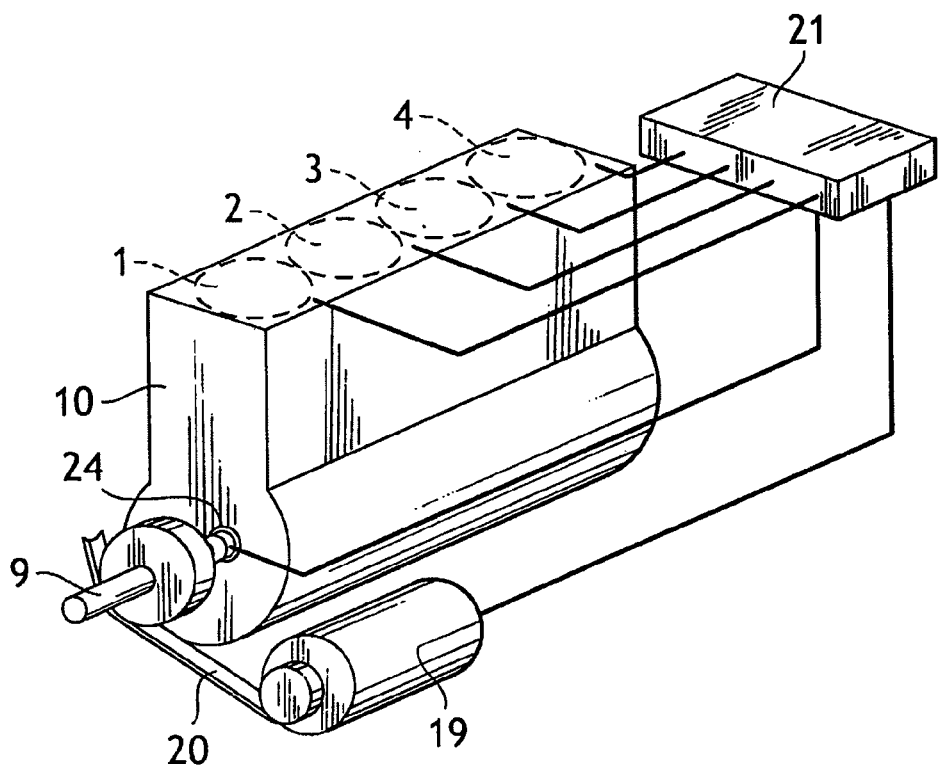
FIG. 1 is a schematic view in perspective of a heat engine according to the invention.
Figure 2:
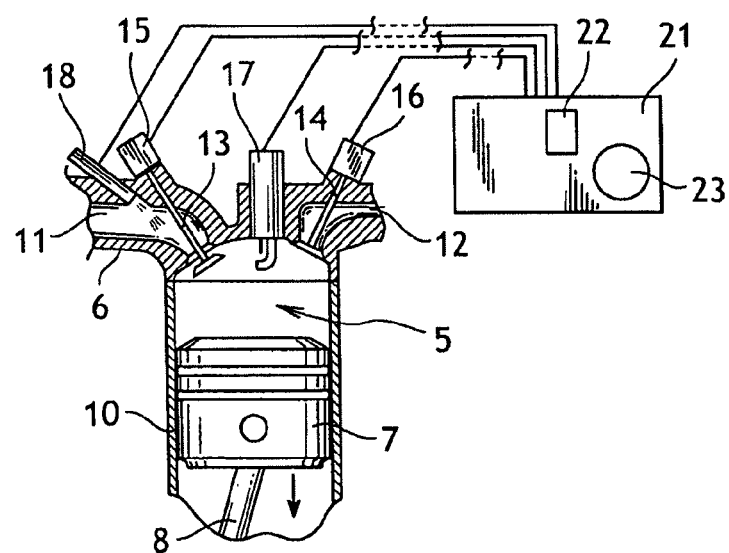
FIG. 2 is a partial schematic view in cross section of this engine.

With reference to the figures, the heat engine according to the invention comprises a block 10 delimiting four in-line cylinders 1, 2, 3, 4. Each cylinder 1, 2, 3, 4 defines a chamber 5 closed on one side by a cylinder head 6 and on the other side by a piston 7 that can be moved slidingly in the cylinder 1, 2, 3, 4 between two extreme positions (top dead center and bottom dead center) and connected via a connecting rod 8 to a crankshaft 9 mounted pivotingly in the block 10.

An inlet duct 11 and an exhaust duct 12 that are arranged in the cylinder head 6 lead into each combustion chamber 5. The inlet duct 11 and the exhaust duct 12 are fitted respectively with an inlet valve 13 and an exhaust valve 14 moved between two positions, open and closed, by electromagnetic actuators 15, 16 respectively.

A spark plug 17 is mounted on the cylinder head 6 in order to lead into the combustion chamber 5. The spark plug 17 is connected to an ignition circuit known per se and not shown here.

An injector 18 of a fuel supply device is also mounted on the cylinder head 6.

The engine also comprises an alternator starter 19 connected in a manner known per se to the crankshaft 9 by a belt 20. The alternator starter 19 is a device that is known per se, connected to the battery and capable of operating like an electric motor or like an alternator. When it operates like an electric motor, the alternator starter 19 is supplied by the battery and supplies the crankshaft 9 with an additional torque in order to rotate the crankshaft 9. The alternator starter 19 is therefore used for starting the heat engine. When it operates like an alternator, the alternator starter 19 is driven by the crankshaft 9 in order to recharge the battery.

The engine also comprises a management member 21 connected notably to the injectors 18, to the electromagnetic actuators 15, 16, to the ignition circuit and to the alternator starter 19 in order to control the latter. The management member 21 comprises for example a microprocessor 22 associated with a memory 23 containing programs run by the micro-processor 22. The management member 21 is in this instance arranged to detect in a manner known per se the conditions of a deactivation of a combustion chamber 5 at the moment td and the reactivation at the moment tr.

A detector 24 is mounted on the block 10 in order to detect the instantaneous speed of the crankshaft 9. The detector 24 is connected to the management member 21.

When the engine is subjected to a constant load (that is to say that the speed of the heat engine is constant and the crankshaft 9 rotates at a nominal speed), the engine control unit 21 commands the deactivation of one or two of the cylinders 1, 2, 3, 4. The theoretical resultant torque obtained varies between a value CN corresponding to the nominal torque before the deactivation and a value CD during the deactivation of the combustion chamber as shown in solid line in FIG. 3. The nominal torque has for example a value of 200 N·m while the deactivation torque has a value of 194 N·m, namely a difference of 6 N·m. In reality, the deactivation of one or two of the cylinders 1, 2, 3, 4 causes an imbalance of the crankshaft 9 which results in a succession of accelerations or decelerations of the crankshaft 9 as illustrated in dashed line in FIG. 3.

According to a first aspect of the invention, the management member 21 is configured to control the rotating machine in order to apply to the output shaft a correction torque CMT on the one hand during a period of time beginning before the moment of deactivation td and on the other hand for a period of time beginning before the moment of reactivation tr. The compensating torque is applied in a manner tending to cause, preferably in a continuous and linear manner, a resultant torque applied to the output shaft to change, including the imbalance torque, toward the deactivation torque CD until it reaches the latter. In the embodiment illustrated by FIG. 4, the compensating torque changes in a continuous manner in the direction of an increasing retardation from the moment t0 from which it is applied up to the moment of deactivation td, then in the direction of a decreasing acceleration from the moment of deactivation td up to the end of the application of the compensation signal at the moment t1. For the numerical values given above relating to the nominal torque CN and the deactivation torque CD, the compensating torque CMT therefore varies in a continuous linear manner from 0 to −3 between t0 and td and in a linear manner from +3 to 0 between td and t1. The negative values indicate a retardation torque applied to the output shaft while the positive values indicate an acceleration torque applied to the output shaft. Conversely, at the moment of reactivation of the combustion chamber, the compensating torque varies from 0 to +3 between a moment t2 preceding the moment of reactivation tr and from −3 to 0 between the moment of reactivation tr and a moment t3 when the compensating torque ceases to be applied. As an example, the periods t0, t1 and t2, t3 have a duration of approximately 100 ms.

The theoretical resultant torque is illustrated by FIG. 5 but because of the imbalance created by the deactivation and reactivation, the imbalance which had been noted in FIG. 3 is only reduced as illustrated by FIG. 6.

According to a preferred embodiment illustrated by FIG. 7, a correction torque is superposed on the compensating torque in a direction tending to return the resultant torque to the theoretical value of the resultant torque as illustrated by FIG. 5. In practice, the compensation is made by measuring the variations of speed of rotation of the crankshaft by means of the detector 24 and by converting this variation of speed of rotation to a variation of resultant torque applied to the output shaft, the correction torque being computed by the management member 21 and applied by the alternator starter 19 in order to be in phase opposition with the variations of the resultant torque relative to the torque that is sought.

Because of the lag between the detection and the computing of the correction torque, the resultant torque is not absolutely identical to the theoretical resultant torque but the imbalance is nevertheless minimized as illustrated by FIG. 8 and the remaining imbalance is imperceptible to the occupants of the vehicle.

In practice, the detector 24 transmits to the management member 21 a signal representative of the instantaneous speed of the crankshaft. The management member 21 then controls the alternator starter 19 so that the latter:

draws off a greater share of torque from the crankshaft 9 when the crankshaft 9 accelerates to return the crankshaft 9 to its nominal speed, draws off a lesser share of torque or supplies an additional torque when the crankshaft 9 decelerates to return the crankshaft 9 to its nominal speed.

The share of torque drawn off and the additional torque to be supplied are in this instance determined by the engine control unit 21 according to the difference between the instantaneous speed of the output shaft 9 and the nominal rotation speed that the latter should have for the operating speed of the engine.

The alternator starter 19 therefore makes it possible to compensate for the imbalance of the crankshaft 9 produced by the deactivation of one or more cylinders.

The memory 23 in this instance also comprises laws for controlling the alternator starter 19 according to the deactivated cylinder(s). It is possible to control the alternator starter 19 either according to the speed detected by the detector 24, or according to one of the control laws stored in the memory 23. It is also possible to combine these two control modes for the purpose of optimizing the compensation for the imbalance.

The management member 21, the detector 24 and the alternator starter 19 therefore form components of a system for managing the deactivation of cylinders of the engine ensuring that the imbalance of the latter is compensated for.

The engine may advantageously comprise an angular position sensor instead of the detector 24 or in association with the latter in order to allow a predictive control of the alternator starter (according to torque profiles for example) optionally associated with a closed-loop control according to the speed of rotation of the crankshaft.

Naturally, the invention is not limited to the embodiment described and it is possible to apply variant embodiments thereto without departing from the context of the invention as defined by the claims.

In particular, it is possible to use, instead of the alternator starter, any other rotating machine capable of drawing off a share of torque from the crankshaft and/or of supplying the crankshaft with an additional torque. The rotating machine used may therefore be a conventional alternator. The alternator starter may also be connected to the crankshaft via the gearbox.

In addition, the invention is applicable to any type of engine and for example to a rotary engine of the WANKEL type or to an engine with uncontrolled ignition such as a diesel engine. The number of cylinders may be other than four.

The members for actuating the valves may be cam shafts.

Although the compensating torque has been illustrated according to an application divided into two periods of equal durations, the compensation may be performed according to another division relative to the moment of deactivation td, the division illustrated however being preferred in order to optimize the imbalance.

The invention claimed is:

1. A system for managing a deactivation of a combustion chamber of a heat engine comprising:
    a plurality of combustion chambers, each of which is mounted a piston connected to an output shaft in order to apply a torque thereto,
    a rotating machine connected to the output shaft and associated with a management member connected to the rotating machine,
    wherein the management member is configured so as to detect conditions of deactivation of a one of the plurality of combustion chambers and to control the rotating machine in order to apply to the output shaft, prior to the deactivation of the one combustion chamber, a compensating torque tending to cause a resultant torque applied to the output shaft to change toward a deactivation torque applied by the heat engine to the output shaft after deactivation of the one combustion chamber.

2. The system as claimed in claim 1, wherein the compensating torque is also applied after the deactivation of the combustion chamber.

3. The system as claimed in claim 2, wherein the rotating machine is controlled so that, at the moment of deactivation, the resultant torque is at an average value between a nominal torque before the deactivation and the deactivation torque.

4. The system as claimed in claim 1, wherein the rotating machine is controlled so that the resultant torque changes in a generally continuous manner.

5. The system as claimed in claim 4, wherein the rotating machine is controlled so that the resultant torque changes in a generally linear manner.

6. The system as claimed in claim 1, wherein the management member is configured to apply to the output shaft a correction torque compensating for an imbalance of the output shaft.

7. The system as claimed in claim 1, wherein the management member is configured to control the rotating machine in order to apply to the output shaft, prior to a reactivation of the combustion chamber, a reactivation compensating torque to the output shaft tending to cause a resultant torque applied to the output shaft to change toward a nominal torque.

8. A method for managing a torque applied to an output shaft of a heat engine comprising combustion chambers; each of which is mounted a piston connected to the output shaft in order to apply a torque thereto, wherein the output shaft is connected to a rotating machine associated with a management member, the method comprising:
    detecting conditions of deactivation of a combustion chamber; and
    controlling the rotating machine in order to apply to the output shaft, prior to the deactivation of the combustion chamber, a compensating torque tending to cause a resultant torque applied to the output shaft to change toward a deactivation torque applied by the heat engine to the output shaft after deactivation of the combustion chamber.

9. The method as claimed in claim 8, wherein the compensating torque is also applied after the deactivation of the combustion chamber.

10. The method as claimed in claim 9, wherein the rotating machine is controlled so that, at the moment of deactivation, the resultant torque is at an average value between a nominal torque before the deactivation and the deactivation torque.

11. The method as claimed in claim 8, wherein the rotating machine is controlled so that the resultant torque changes in a generally continuous manner.

12. The method as claimed in claim 11, wherein the rotating machine is controlled so that the resultant torque changes in a generally linear manner.

13. The method as claimed in claim 8, further comprising:
applying to the output shaft a correction torque compensating for an imbalance of the output shaft.

14. The method as claimed in claim 8, further comprising:
controlling the rotating machine in order to apply to the output shaft, prior to a reactivation of the combustion chamber, a reactivation compensating torque to the output shaft tending to cause a resultant torque applied to the output shaft to change toward a nominal torque.

15. The method as claimed in claim 14, wherein the reactivation compensating torque is also applied after the reactivation of the combustion chamber.

16. The method as claimed in claim 14, wherein the rotating machine is controlled so that the resultant torque changes in a generally continuous manner.

17. The method as claimed in claim 16, wherein the rotating machine is controlled so that the resultant torque changes in a generally linear manner.

* * * * *